United States Patent
Im et al.

(10) Patent No.: US 9,807,489 B2
(45) Date of Patent: *Oct. 31, 2017

(54) METHOD FOR NOISE REMOVAL OF EAR PHONE IN PORTABLE TERMINAL AND APPARATUS THEREOF

(71) Applicant: Samsung Electronics Co., Ltd., Gyeonggi-do (KR)

(72) Inventors: Mu Seon Im, Gyeonggi-do (KR); Yong Seong Jeong, Gyeonggi-do (KR); Hyung Woo Park, Gyeonggi-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/726,968

(22) Filed: Jun. 1, 2015

(65) Prior Publication Data
US 2015/0264466 A1 Sep. 17, 2015

Related U.S. Application Data

(63) Continuation of application No. 12/789,648, filed on May 28, 2010, now Pat. No. 9,049,301.

(30) Foreign Application Priority Data

May 29, 2009 (KR) .......................... 10-2009-0047547

(51) Int. Cl.
*G10K 11/16* (2006.01)
*H04R 1/10* (2006.01)
(Continued)

(52) U.S. Cl.
CPC ........ *H04R 1/1025* (2013.01); *H04M 1/6008* (2013.01); *H04M 1/6058* (2013.01); *H04R 1/1083* (2013.01); *H04R 3/00* (2013.01)

(58) Field of Classification Search
CPC .... H04R 3/00; H04R 1/1041; H04R 2499/11; H04R 2420/05; H04R 5/04;
(Continued)

(56) References Cited

U.S. PATENT DOCUMENTS 6,069,960 A * 5/2000 Mizukami ................ H04R 5/04
381/120
6,122,369 A 9/2000 Hwang et al.
(Continued)

FOREIGN PATENT DOCUMENTS

JP 2008-92366 A 4/2008
KR 10-2007-0001711 A 1/2007
(Continued)

*Primary Examiner* — Lun-See Lao
(74) *Attorney, Agent, or Firm* — Cha & Reiter, LLC.

(57) ABSTRACT

Provided is a method of removing an earphone noise of a portable terminal includes: recognizing a connection of an earphone through an interface unit; applying power to a mike bias port in case the earphone is recognized; sensing a signal which indicating a detachment of the earphone from the interface unit during applying power to the mike bias port; and discharging the power of the mike bias port when the detachment occurs.

16 Claims, 5 Drawing Sheets

(51) Int. Cl.
*H04M 1/60* (2006.01)
*H04R 3/00* (2006.01)

(58) Field of Classification Search
CPC .............. H04R 2460/03; H04R 1/1083; H04R 2499/13; H04R 29/004; H04R 19/005; H04R 19/04; H04M 1/0274; H04M 1/6008; H04M 1/0202; H04M 1/04; H04M 1/6066; H04M 1/7253; H04M 1/72575; H04M 1/72591; H04M 2250/74
USPC .................. 381/309, 123, 122, 384, 11–117; 379/421–423, 430
See application file for complete search history.

(56) References Cited

U.S. PATENT DOCUMENTS

| | | | |
|---|---|---|---|
| 6,970,752 B1 * | 11/2005 | Lim ....................... | H03M 11/24 381/123 |
| 7,248,707 B2 * | 7/2007 | Peng ....................... | H01R 24/58 381/74 |
| 7,450,726 B2 | 11/2008 | Goyal | |
| 8,064,613 B1 | 11/2011 | Helfrich | |
| 9,049,301 B2 * | 6/2015 | Im ....................... | H04M 1/6008 |
| 2007/0297623 A1 | 12/2007 | Kuiri | |
| 2012/0183160 A1 | 7/2012 | Abe et al. | |

FOREIGN PATENT DOCUMENTS

| KR | 10-2007-0022442 A | 2/2007 |
|---|---|---|
| KR | 10-2008-0080854 A | 9/2008 |

\* cited by examiner

METHOD FOR NOISE REMOVAL OF EAR PHONE IN PORTABLE TERMINAL AND APPARATUS THEREOF

CROSS REFERENCE TO RELATED APPLICATIONS

This application is a Continuation of U.S. patent application Ser. No. 12/789,648 filed on May 28, 2010 which claims the benefit under 35 U.S.C. §119 (a) of a Korean patent application filed in the Korean Intellectual Property Office on May 29, 2009 and assigned Serial No. 10-2009-0047547, and the entire disclosure of which is hereby incorporated by reference

BACKGROUND

Field of the Invention

The present invention relates to a method of removing an earphone noise and an apparatus thereof, and more particularly, to an apparatus and method of removing a noise generated by the power of microphone bias (MIC_Bias) of a portable terminal.

Description of the Related Art

A portable terminal provides various features such as a playing function of listening or watching an audio file or a video file that are previously stored, a camera function for photographing or taking a video, a digital broadcasting function for watching broadcast data transmitted from a broadcasting station, a wireless internet function for the usage of internet, and a message function for transmission of a short message or a multimedia message. Among these functions, an audio file playing function, in particular, is a function of playing various audio files that are prestored outputting the audio file through a speaker, and uses an earphone.

In operation, when a portable terminal uses a four-pole earphone, noise can be generated when detaching the four-pole earphone. In particular, noise can be generated while the L terminal or the R terminal of the four-pole earphone is in contact with the portable terminal when detaching the four-pole earphone from the interface unit. That is, the portable terminal turns the microphone (hereinafter "mike") bias power off of the earphone from the point of when the four-pole earphone is not recognized. However, although the supply of the mike bias power is turned off, the mike bias power is not fully discharged within a time that the L terminal and the R terminal of the four-pole earphone are detached from the interface unit. Hence, the portable terminal recognizes that the L terminal and the R terminal of the four-pole earphone are still in contact with the mike terminal, so that it generates a noise.

SUMMARY

The present invention has been made in view of the above problems, and provides a method of removing an earphone noise of a portable terminal and an apparatus thereof, which is capable of suppressing the generation of a noise by implementing a discharge switch which performs a discharge function in a mike bias port so as to rapidly discharge a mike bias power when detaching an earphone from the portable terminal.

In accordance with an aspect of the present invention, a method of removing an earphone noise of a portable terminal includes: applying power to a mike bias port when the earphone coupled to the portable terminal via an interface unit; sensing a detachment of the earphone from the interface unit during operation; and discharging the power of the mike bias port when the detachment of the earphone occurs.

In accordance with another aspect of the present invention, a portable terminal includes: an interface unit which detachably coupled to an earphone; and a controller which controls to generate a first signal and apply power to a mike bias port in case the earphone is coupled through the interface unit, and to generate a second signal and discharge the power of the mike bias port through a discharge process unit when detachment of the earphone occurs.

BRIEF DESCRIPTION OF THE DRAWINGS

The above and other aspects, features, and advantages of certain exemplary embodiments of the present invention will be more apparent from the following description taken in conjunction with the accompanying drawings, in which.

DETAILED DESCRIPTION

Exemplary embodiments of the present invention are described with reference to the accompanying drawings in detail. The same reference numbers are used throughout the drawings to refer to the same or like parts. For the purposes of clarity and simplicity, detailed descriptions of well-known functions and structures incorporated herein may be omitted to avoid obscuring the subject matter of the present invention.

A four-pole earphone is illustrated as a representative example of an earphone according to an exemplary embodiment of the present invention. However, the earphone according to an exemplary embodiment of the present invention is not limited to it, but can include various earphones which are connected to a portable terminal.

Moreover, the teachings of the present invention can apply to other types of communication and information devices, multimedia devices, and the applications thereof such as, a portable terminal having a call function, a mobile phone, a smart phone, an international mobile telecommunication 2000 (IMT-2000), Code Division Multiple Access (CDMA) terminal, Global Standard for Mobile Communication (GSM) terminal, Wideband Code Division Multiple Access (WCDMA) terminal, High Speed Downlink Packet Access (HSDPA) terminal, World Interoperability for Microwave Access (Wimax) terminal and a Universal Mobile Telecommunication Service (UMTS) terminal.

Figure 1:
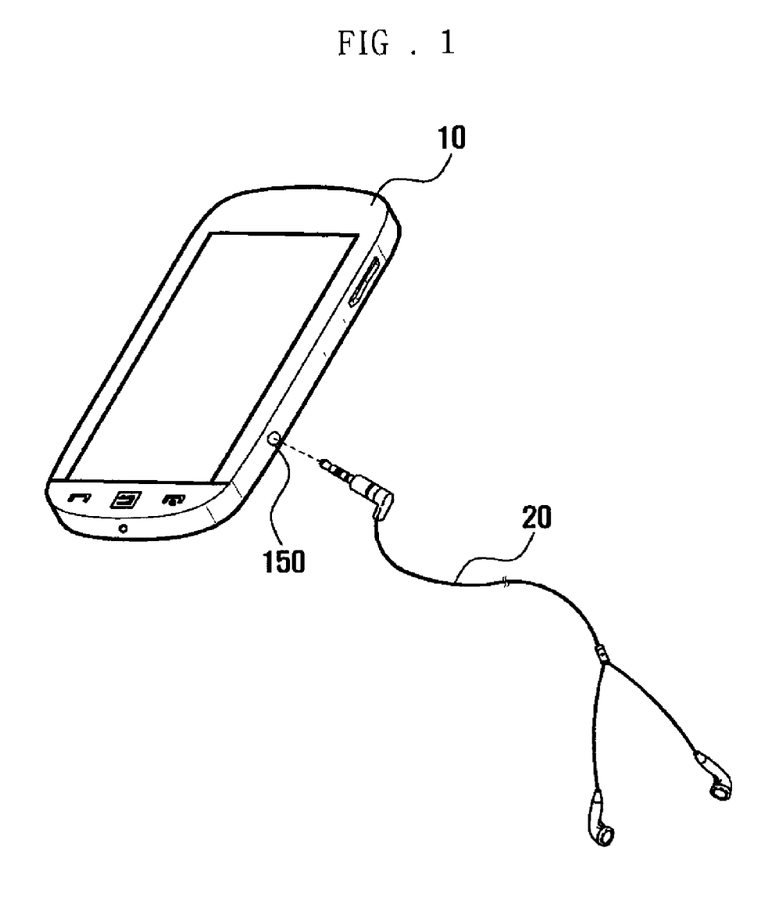
FIG. 1 is a drawing illustrating a schematic configuration of a portable terminal to which an earphone is connected according to an exemplary embodiment of the present invention.

FIG. 1 is a drawing illustrating a schematic configuration of a portable terminal to which an earphone can be connected according to an exemplary embodiment of the present invention.

Referring to FIG. 1, the portable terminal according to an exemplary embodiment of the present invention includes a portable terminal body 10 and an earphone 20 attachable to the portable terminal body 10. The portable terminal body 10 can be classified into various types, for example, a slide type, a folder-type, a bar type, and a full-touch type. It is preferable that the portable terminal of the present invention has an interface unit 150 by which the portable terminal body 10 is detachable coupled to the earphone 20.

The interface unit 150 can be connected an external device, such as an external speaker function or the like.

The earphone 20 can include a connection unit, which is detachable to the interface unit 150 of the portable terminal, a pair of ear speaker, and an ear-microphone which collects an audio signal of a user in the voice phone call. Moreover, the earphone 20 can include a Send/End key for requesting or terminating a call.

Figure 2:
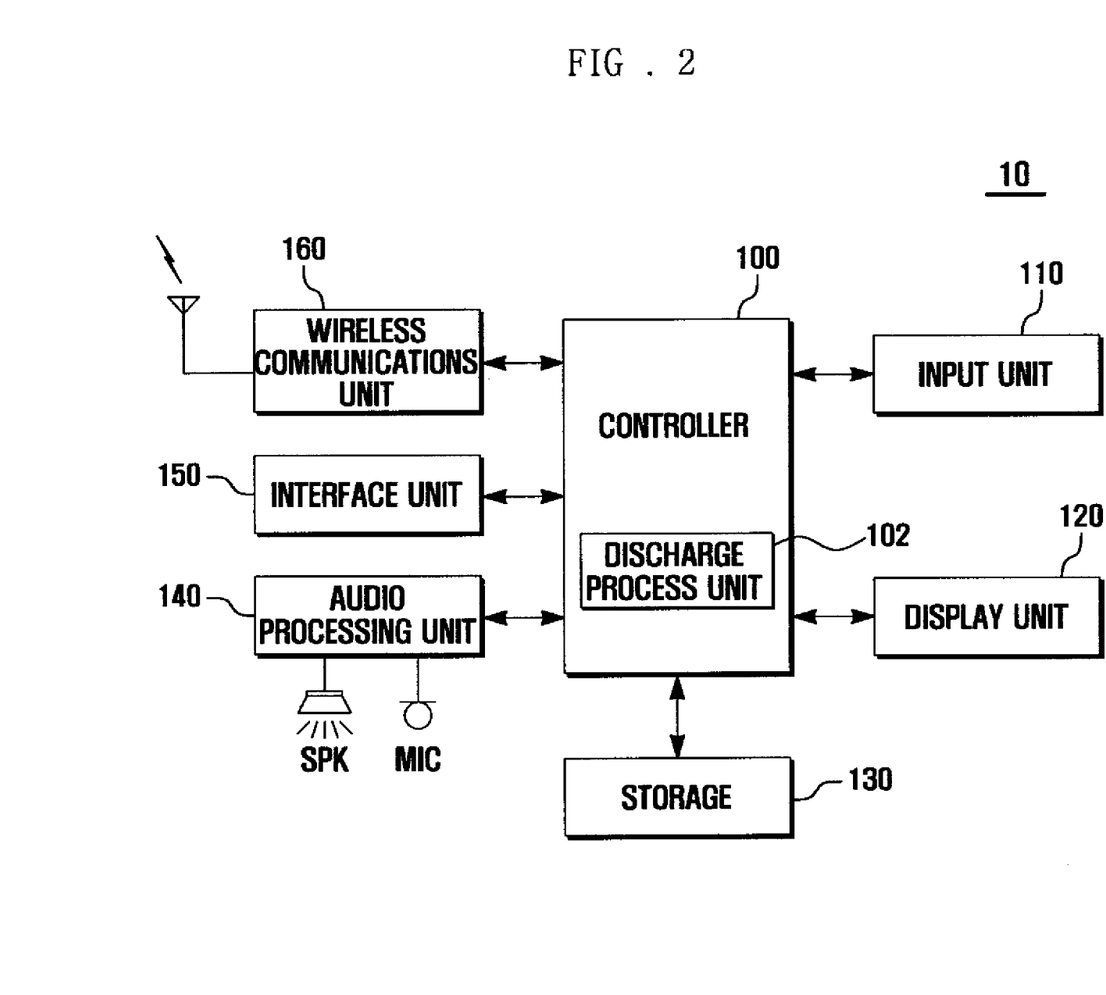
FIG. 2 is a block diagram which schematically illustrating a configuration of a portable terminal according to an exemplary embodiment of the present invention.

FIG. 2 is a block diagram which schematically illustrating a configuration of a portable terminal according to an exemplary embodiment of the present invention.

Referring to FIG. 2, the portable terminal body 10 of the present invention includes an input unit 110, a display unit 120, a storage 130, an audio processing unit 140, an interface unit 150, a wireless communications unit 160, and a controller 100. The controller 100 can include a discharge processing unit.

The input unit 110 inputs numeric information and character information, and includes a numeric key, a character key and/or a function key for setting various functions. The input unit 110 generates an input signal for activating a voice call function, an input signal for selecting a file stored in the storage 130, and an input signal for playing a selected file according to user's input. These generated input signals are sent to the controller 100.

The display unit 120 displays image data outputted from the controller 100, user data requested from a user, and also displays a supplementary feature screen. Here, the display unit 120 may include a liquid crystal display (LCD). However, the display unit of the present invention is not limited to a LCD. The display unit can be applied to organic light emitting diodes (OLED) and applications thereof. If the earphone 20 is connected through the interface unit 150, the controller 100 recognizes the earphone 20 and the display unit 120 can display the connection state of the earphone 20. To this end, the display unit 120 can generate a pop up window informing the connection of the earphone 20 or can display an icon informing the connection of the earphone 20 to one side of the screen.

The storage 130 can store an operating system (OS) for booting and application programs, e.g., a file playing function, a camera function, and a watching TV function. Moreover, the storage 130 can store user data generated according to the use of portable terminal, and data received through a communications channel. The storage 130 can store application programs for supporting above-described functions. Particularly, the storage 130 can store a program that generates a control signal for applying the required bias voltage (hereinafter "a mike bias power") in case the ear phone is connected to the interface unit 150 and a program that generates a control signal for discharging a mike bias power in case the ear phone is detached from the interface unit 150.

The audio processing unit 140 outputs the audio signal sent from the controller 100 through the speaker (SPK) or transmits the audio signal such as voice signal inputted from the microphone MIC to the controller 100. That is, the audio processing unit 140 converts voice/sound data into an audible sound through the speaker (SPK) under the control of the controller 100 outputs the sound. The audio processing unit 140 also converts the audio signal such as voice signal received from the microphone (MIC), into digital data and sends it to the controller 110. Moreover, when the earphone 20 is connected to or separated from the interface unit 150, the audio processing unit 140 can output an audio signal for informing of connection or separation. Here, this audio signal can be changed according to the menu setting or volume setting of portable terminal.

The interface unit 150 provides a connection means which enable the earphone 20 to contact the portable terminal body 10 to send and receive an audio signal. In other words, the interface unit 150 provides an interface for communications between the portable terminal body 10 and the earphone 20, and provides a path for transmitting the voice signal sent from the ear-mike of the earphone 20 to the controller 100. Moreover, the interface unit 150 can provide a path for transmitting the function sound/sound effect generated in the controller 100 to the earphone 20 or transmitting the receiving voice received from the wireless communications unit 160 to the earphone 20. In particular, the interface unit 150 of the present invention can send a signal that informs that the L terminal of the earphone 20 is in contact to a Jack_s terminal or when the earphone 20 is inserted.

The wireless communications unit 160 performs the transceiving of a signal relating with the mobile phone communication, the short message service (SMS) or multimedia message service (MMS), the voice communications and data communications or the like. Moreover, the wireless communications unit 160 converts voice/sound data and control data into a wireless signal and transmits it to base station, and receives a wireless signal from the base station and converts it into voice/sound data and control data and sends it to the controller 100. To this end, the wireless communications unit 160 provides a wireless frequency transmitter which up-converts and amplifies the frequency of the transmitted signal, and a wireless frequency reception unit which low-noise amplifies the received signal and down-converts the frequency. Particularly, the wireless communications unit 160 according to an exemplary embodiment of the present invention performs the role of transmitting the voice signals under the control of the controller 100. The controller 100 controls the overall operation of portable terminal and a signal flow between internal blocks of portable terminal. That is, the controller 100 controls a signal flow between each configuration such as the input unit 110, the display unit 120, the storage unit 130, the audio processing unit 140, the interface unit 150 and the wireless communications unit 160. Particularly, the controller 100 according to an exemplary embodiment of the present invention can use a General Purpose Input/Output (GPIO) port so as to recognize the earphone 20 connected to the interface unit 150.

If the controller 100 receives a signal which informs that the L terminal of the earphone 20 is in contact with the Jack_s terminal or the L terminal of the interface unit 150 from the interface unit 150, the controller 100 can input the control signal of an enable (EN) port with a high signal so as to apply mike bias power to the mike bias port. The high signal is voltage signal of more than a preset value (e.g. 1.5 V). Here, in case the control signal of the EN port is a high signal, the controller 100 can control to open a discharge switch and apply mike bias power to the mike bias power port. If a signal indicating that the earphone 20 is detached from the interface unit 150 is sensed, the controller 100 controls to block the mike bias power. That is, if the L terminal of the earphone 20 is detached from the Jack_s terminal or the L terminal of the interface unit 150, the controller 100 can input the control signal of the EN port with a low signal so as to block the mike bias power from being applied to the mike bias port. The low signal is voltage signal of more than the preset value (e.g. 1.5 V). Here, in case the control signal of the EN port is a low signal, the controller 100 can control to close the discharge switch and to discharge the mike bias power remaining in the mike bias port through the discharge switch. The controller 100 can include a discharge process unit 102 to more effectively achieve a discharging function. Particularly, the discharge process unit 102 according to an exemplary embodiment of the present invention controls the discharge switch in response to the control signal of the EN port to discharge the mike bias power.

Figure 3:
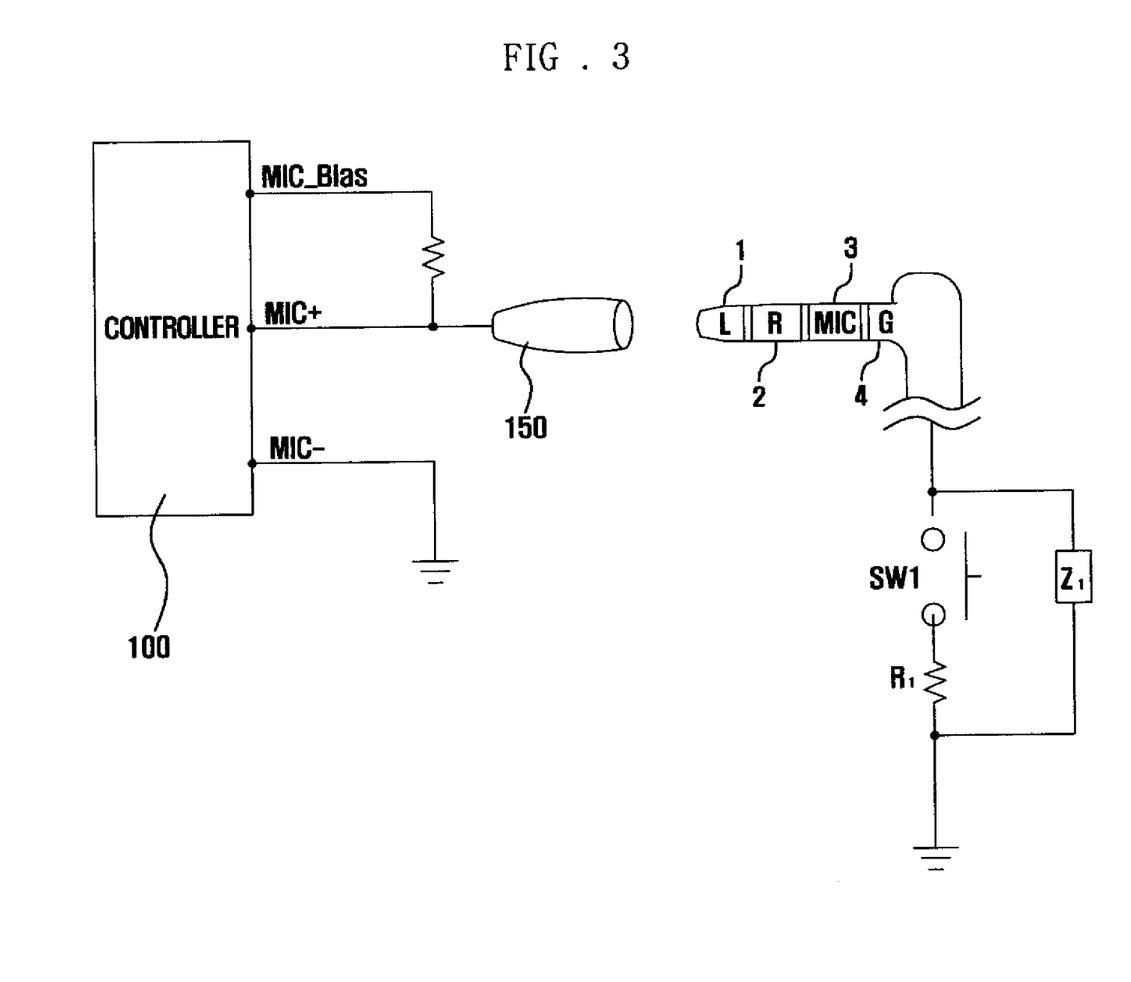
FIG. 3 is a circuit diagram illustrating a configuration of an interface unit of a portable terminal and an earphone according to an exemplary embodiment of the present invention.

FIG. 3 is a circuit diagram illustrating a configuration of an interface unit of a portable terminal and an earphone according to an exemplary embodiment of the present invention.

Referring to FIG. 3, the earphone 20 includes a L terminal Ear_L 1, a R terminal Ear_R 2, a mike terminal MIC 3, and a ground terminal GND 4 connected to the interface unit 150. While being connected to the interface unit 150, the earphone 20 having such configuration can be contacted with a signal line corresponding to each terminal of the interface unit 150. In more detail, in case the four-pole earphone 20 is connected to the interface unit 150, the L terminal 1 is contacted with a signal line connected to the L terminal of the interface unit 150. Accordingly, the audio processing unit 140 can send an audio signal outputted to the L terminal of the interface unit 150 to the L terminal 1 of the earphone 20 according to the signal line. Moreover, the R terminal 2 is in contact with a signal line connected to the R terminal of the interface unit 150. Accordingly, the audio processing unit 140 can send the audio signal outputted to R terminal of the interface unit 150 to R terminal 2 of the earphone 20 according to the signal line. Further, the mike terminal 3 is in contact with a signal line connected to the mike terminal of the interface unit 150. Accordingly, the audio processing unit 140 can send an audio signal outputted to the mike terminal of the interface unit 150 to the mike terminal 3 of the earphone 20 through the signal line. Moreover, the ground terminal 4 can be contacted with a ground terminal of the interface unit 150.

The earphone 20 can be comprised of a switch SW1, a mike impedance Z1, and a switch resistance R1 so as to switch the call/end function. If the switch SW1 is inputted by user, the earphone 20 can send a corresponding signal to the portable terminal body 10. Here, the signal can be transmitted to the portable terminal through the mike terminal 3 of the earphone 20.

Firstly, if the earphone 20 is connected to the interface unit 150 of the portable terminal body 10, the controller 100 controls to apply reference power VDD to the mike bias port of the interface unit 150. Here, when a signal which informs that the L terminal of the earphone 20 is in contact with the Jack_s terminal or the L terminal of the interface unit 150 is sent from the interface unit 150, the controller 100 can determine that the earphone 20 is connected to the interface unit 150. At this time, the controller 100 controls in such a manner that the reference power VDD is continuously applied to the mike bias port of the interface unit 150.

In detail, in case the controller 100 recognizes that the earphone 20 is connected to the interface unit 150, the control signal of the EN port can be inputted with a high signal so as to apply the mike bias power to the mike bias port of the interface unit 150. At this time, if the control signal is inputted with a high signal, the controller 100 controls to open a discharge switch, and to apply the mike bias power to the mike bias port of the interface unit 150. If power is applied to the mike bias port of the interface unit 150, the controller 100 can analyze a signal generated in the earphone 20 and execute a corresponding operation. For instance, according to a signal generated in the earphone 20, the controller 100 can measure the current of the mike bias port of the interface unit 150 or the voltage of the mike plus port MIC+ of the interface unit 150 to execute a switch function. However, the portable terminal according to an exemplary embodiment of the present invention is not limited to the switch function, but various functions can be executed according to the signal generated in earphone. Moreover, the controller 100 can sense that the earphone 20 is removed from the interface unit 150. Here, if the L terminal of the earphone 20 is detached from the Jack_s terminal or the L terminal of the interface unit 150, the controller 100 can control to block the reference power VDD applied to the mike bias port of the interface unit 150.

In detail, if the earphone 20 is detached from the interface unit 150, the controller 100 can input the control signal of the EN port with a low signal in order to block the mike bias power applied to the mike bias port of the interface unit 150. At this time, if the control signal is inputted with a low signal, the controller 100 can control in such a manner that the discharge switch is closed and the switch which was connected to apply the mike bias power is opened. That is, the controller 100 can control to operate the discharge switch for suppressing a noise, which is generated when removing the earphone, by rapidly discharging the mike bias power applied to the mike bias port.

Figure 4:
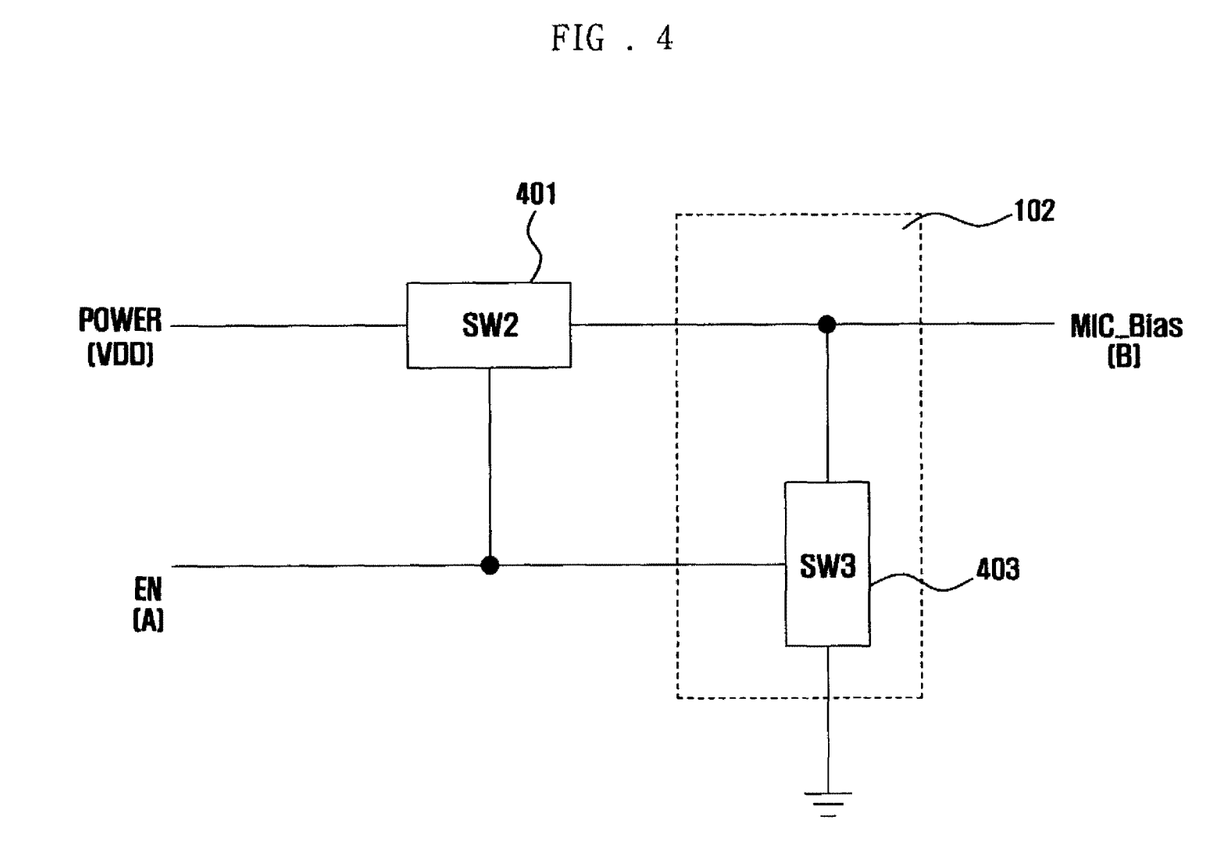
FIG. 4 is a drawing illustrating a mike bias power discharge function of a portable terminal according to an exemplary embodiment of the present invention.

FIG. 4 is a drawing illustrating a mike bias power discharge function of a portable terminal 10 according to an exemplary embodiment of the present invention.

Referring to FIG. 4, the controller 100 can execute the function of discharging the power of the mike bias port by using the discharge switch SW3 403 of the discharge process unit 102. That is, the controller 100 can control the discharge switch 403 to connect to the mike bias port in order to remove the noise generated by the contact of the terminal of the earphone 20 and the interface unit 150 by rapidly discharging the power applied to the mike bias port in the process where the earphone 20 is removed from the interface unit 150. Hereinafter, the mike bias power discharging function of the portable terminal 10 is illustrated with reference to drawing. Firstly, the controller 100 can recognize the connection of the earphone 20 through the signal received from the interface unit 150. That is, if the controller 100 receives a signal which informs that the L terminal of the earphone 20 is contacted with the Jack_s terminal or the L terminal of the interface unit 150 from the interface unit 150, the controller 100 can determine that the earphone 20 is connected to the interface unit 150. If the earphone is connected to the interface unit 150, the controller 100 can change the control signal of the EN port (A) in order to apply the reference power VDD to the mike bias port (B).

At this time, the control signal can be a high signal, and the controller 100 controls the control switch SW2 401 to close through the high signal, so that the controller 100 can apply the reference power VDD to the mike bias port (B). In the meantime, if the control signal of the EN port (A) is a high signal, the discharge switch SW3 403 becomes open state, so that the reference power VDD applied to the mike bias port (B) is not discharged. That is, if the control switch 401 is closed and the discharge switch 403 is opened, the controller 100 can apply the reference power VDD to the mike bias port (B). If the reference power is applied to the mike bias port (B), the controller 100 can control to perform a corresponding function according to the signal inputted through the earphone 20. Next, the controller 100 can sense the earphone 20 is detached from the interface unit 150. If the L terminal of the earphone 20 is detached from the Jack_s terminal or the L terminal of the interface unit 150, the controller 100 can change the control signal of the EN port (A) in order to turn the reference power VDD applied to the mike bias port (B) off.

At this time, the control signal can be a low signal, and the controller 100 can block the reference power VDD sent to the mike bias port (B) by controlling to open the control switch 401 through the low signal. In the meantime, if the control signal of the EN port (A) is a low signal, the discharge switch 403 is closed and discharges the reference power VDD remaining in the mike bias port (B). That is, if the control switch 401 is opened and the discharge switch 403 is closed, the controller 100 can discharge the reference power VDD applied to the mike bias port (B).

In detail, before the reference power VDD applied to the mike bias port (B) is discharged, the interface unit 150 of the portable terminal 10 can sense that a specific terminal of the earphone 20, i.e., the L terminal or the R terminal is in contact. At this time, the controller 100 can execute a corresponding function according to the signal of the mike terminal generated in the interface unit 150. To prevent this, the controller 100 can operate the discharge switch 403 for discharging the reference power VDD remaining in the mike bias port (B) before a specific terminal of the earphone 20 is in contact. Thus, the controller 100 can suppress the noise which is generated by being contacted with the mike terminal of the interface unit 150 in which the reference power VDD of a specific terminal of the earphone 20 is remained.

Figure 5:
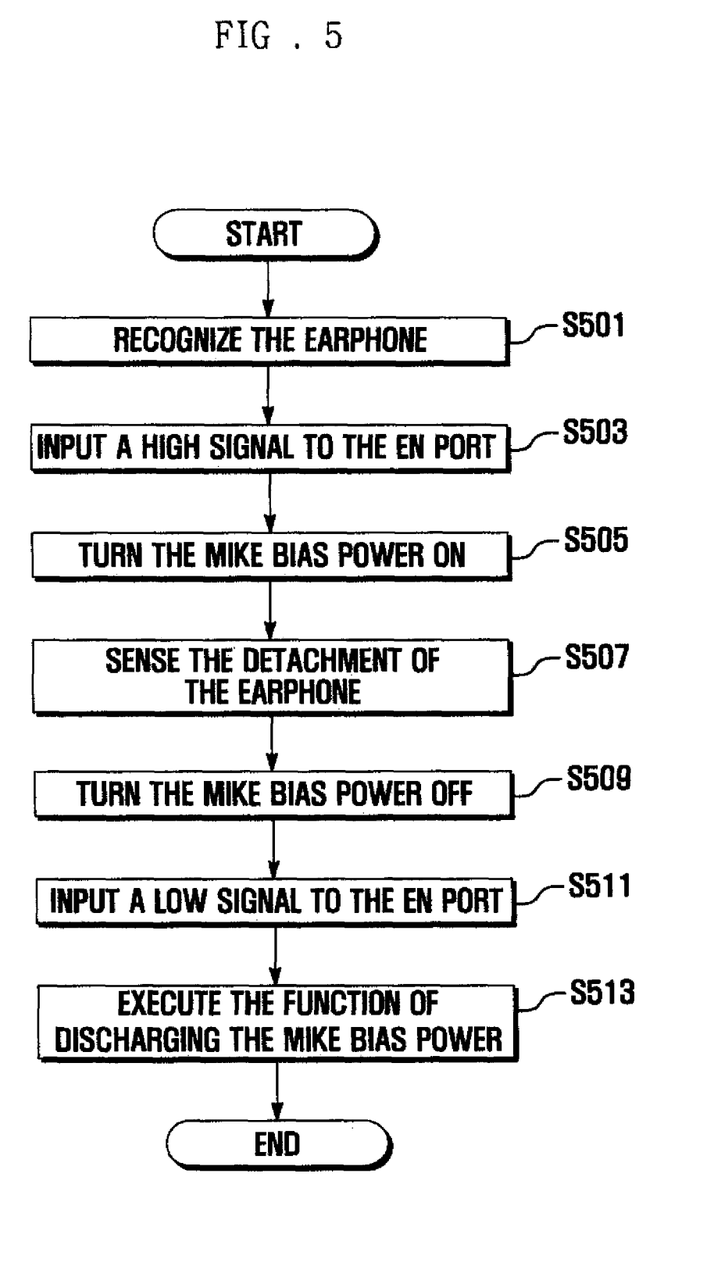
FIG. 5 is a flowchart illustrating a mike bias power discharge function of a portable terminal according to an exemplary embodiment of the present invention.

FIG. 5 is a flowchart illustrating a mike bias power discharge function of a portable terminal according to an exemplary embodiment of the present invention.

Referring to FIG. 5, the controller 100 can recognize the connection of the earphone 20 through a signal received from the interface unit 150 (S501). At this time, a signal informing that the L terminal of the earphone 20 is contacted with the Jack_s terminal or the L terminal of the interface unit 150 is received, the controller 100 can determine that the earphone 20 is connected. If the connection of the earphone 20 is recognized, the controller 100 can input the control signal of the EN port (A) with a high signal (S503). At this time, if a high signal is inputted to the EN port (A), the control switch 401 is closed and the reference power VDD can be applied to the mike bias port (B). Moreover, if a high signal is inputted to the EN port (A), the discharge switch 403 is opened and the reference power VDD of the mike bias port (B) is discharged. If a high signal is inputted to the EN port (A) at step S503, the controller 100 controls to turn the mike bias power for supplying the reference power VDD to the mike bias port (B) on (S505). At this time, the controller 100 can send the reference power VDD applied to the mike bias port (B) through the control switch 401.

The controller 100 can sense that the earphone 20 is detached from the interface unit 150 (S507). Here, if the L terminal of the earphone 20 is detached from the Jack_s terminal or the L terminal of the interface unit 150, the controller 100 receives a signal which is transmitted from the interface unit 150 when the signal informs that the earphone 20 is detached, so that the controller 100 can sense the detachment of the earphone 20. Then, the controller 100 can control to turn the mike bias power off (S509).

The controller 100 can input the control signal of the EN port (A) with a low signal (S511). At this time, if the low signal is inputted, the control switch 401 is opened and the power is not applied to the mike bias port (B). If the low signal is inputted to the EN port (A) at step S511, the controller 100 executes the function of discharging the power applied to the mike bias port (S513). At this time, the controller 100 can discharge the reference power VDD applied to the mike bias port (B) by closing the discharge switch 403 through the low signal. According to the present invention, the noise generated when removing earphone from the portable terminal can be suppressed. Moreover, the noise generated by the contact of the terminal when removing earphone from the portable terminal can be prevented.

The above-described methods according to the present invention can be realized in hardware or via the execution of software or computer code that can be stored in a recording medium such as a CD ROM, an RAM, a floppy disk, a hard disk, or a magneto-optical disk or downloaded over a network, so that the methods described herein can be executed by such software using a general purpose computer, or a special processor or in programmable or dedicated hardware, such as an ASIC or FPGA. As would be understood in the art, the computer, the processor or the programmable hardware include memory components, e.g., RAM, ROM, Flash, etc. that may store or receive software or computer code that when accessed and executed by the computer, processor or hardware implement the processing methods described herein.

Although exemplary embodiments of the present invention have been described in detail hereinabove, it should be clearly understood that many variations and modifications of the basic inventive concepts herein taught which may appear to those skilled in the present art will still fall within the spirit and scope of the present invention, as defined in the appended claims.

What is claimed is:

1. An apparatus comprising:
   interface circuitry including a first electrical contact and a second electrical contact, the first electrical contact to detect a connection with at least a portion of an electronic device external to the apparatus, and the second electrical contact to supply a voltage generated by the apparatus to the electronic device in response to the electronic device being connected through the first electrical contact; and
   at least one switch to couple the second electrical contact with an electrical ground of the apparatus such that at least part of the voltage remaining at the second electrical contact is discharged therefrom in response to the electronic device being detached from the first electrical contact.

2. The apparatus of claim 1, wherein the at least part of the remaining voltage is to be discharged from the second electrical contact to reduce noise at the electronic device.

3. The apparatus of claim 1, wherein the at least one switch is formed as at least part of one or more processors.

4. The apparatus of claim 1, further comprising one or more processors, wherein the one or more processors are configured to:
   control supply of the voltage to the second electrical contact in response to the electrical device being attached with the first electrical contact.

5. The apparatus of claim 4, wherein the one or more processors are configured to:

refrain from supplying the voltage to the second electrical contact in response to the electrical device being detached from the first electrical contact, as at least part of the controlling.

6. The apparatus of claim 1, further comprising one or more processors, wherein the one or more processors are configured to:
control the at least one switch to couple the second electrical contact with the electrical ground in response to the electronic device being detached from the first electrical contact.

7. The apparatus of claim 1, further comprising one or more processors, wherein the one or more processors are configured to:
control the at least one switch to refrain from coupling the second electrical contact with the electrical ground in response to the electronic device being attached with the first electrical contact.

8. The apparatus of claim 1, further comprising:
power control circuitry to provide electrical power to the electronic device through the second electrical contact.

9. The apparatus of claim 1, wherein the electronic device comprises an earphone or a microphone.

10. The apparatus of claim 1, wherein the interface circuitry comprises a connector.

11. The apparatus of claim 1, wherein the voltage supplied at the second electrical contact is a microphone bias voltage.

12. A method comprising:
supplying, at a first electronic device including interface circuitry including a first electrical contact and a second electrical contact, a voltage to a second electronic device external to the first electronic device via the first electrical contact in response to detecting the second electronic device being connected;
detecting attachment or detachment of the second electronic device from the first electronic device via the second electrical contact; and
connecting the first electrical contact with an electrical ground of the first electronic device such that at least part of the voltage remaining at the first electrical contact is discharged therefrom in response to the detachment.

13. The method of claim 12, wherein the at least part of the remaining voltage is discharged from the first electrical contact to reduce noise at the second electronic device.

14. The method of claim 12, wherein the connecting comprises:
refraining from supplying the voltage to the second electronic device via the first electrical contact.

15. The method of claim 12, wherein the connecting comprises:
controlling at least one switch to couple the first electrical contact with the electrical ground.

16. The method of claim 12, wherein the voltage supplied at the first electrical contact is a microphone bias voltage.

* * * * *